Oct. 7, 1969

F. D. WERNER 3,471,758

CAPACITIVE STRAIN SENSOR

Filed Sept. 20, 1967

INVENTOR.
FRANK D. WERNER

BY Robert R. Kooiman

AGENT

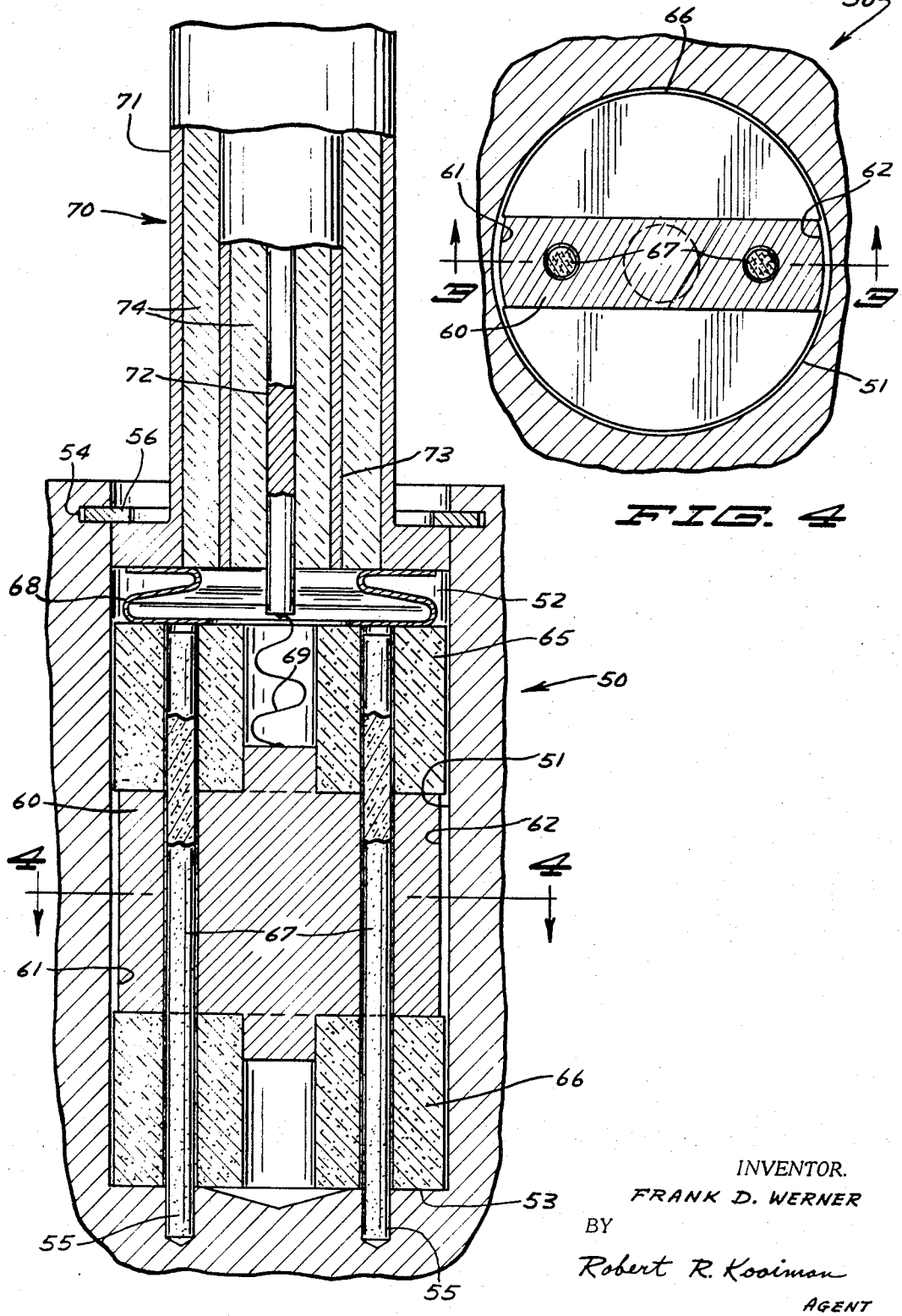

United States Patent Office 3,471,758
Patented Oct. 7, 1969

3,471,758
CAPACITIVE STRAIN SENSOR
Frank D. Werner, Bloomington, Minn., assignor to Rosemount Engineering Company, Minneapolis, Minn., a corporation of Minnesota
Filed Sept. 20, 1967, Ser. No. 669,036
Int. Cl. H01g 7/00
U.S. Cl. 317—246                                    8 Claims

ABSTRACT OF THE DISCLOSURE

A metal rod is mounted transversely within a cylindrical test hole in a metal structure. A spaced relation is maintained between the rod ends and hole surface and changes in electrical capacitance between the rod and the structure are indicative of strains in the test structure.

BACKGROUND OF THE INVENTION

This invention relates generally to measurement of strain and more specifically relates to instrumentation for measurement of strain within a structure which instrumentation comprises an electrical capacitor having a capacitance dependent upon strain of the structure.

Strain measurements of a structure are most generally made with resistance strain gages mounted directly to the structure being measured. The gages may be of wire type or foil type and are most commonly cemented to the structure with an adhesive having very good electrical insulation characteristics and excellent mechanical bonding. The difficulties associated with obtaining a good bond along with high electrical insulation are numerous but good techniques have evolved and while satisfactory measurements can be made for many applications, there are also measurements which cannot be satisfactorily made by resistance gage techniques. In addition to the installation problems of resistance gages there exists a signal handling problem since the resistance change associated with a typical strain range is quite small and typically is less than one percent. Then if it is necessary to measure strain to within one percent a system accuracy of one part in ten thousand is required in terms of the resistance of the gage. Where the thermal environment is not severe strain measurements having an accuracy in the order of one percent are often accomplished with resistance gages but the accuracy and reliability of such techniques falls rapidly as a severe environment, such as a high temperature, is encountered. The problems of maintaining a stable mechanical connection to the structure being measured and obtaining an accurate measurement of only that resistance change due to strain limit the usefulness of such techniques to moderately low temperatures.

A specific problem which has not been satisfactorily solved by prior art methods involves a strain measurement in the walls of large steam turbines used for generation of electrical power. These turbines typically have casing walls eight to ten inches thick and are subject to a temperature change from ambient to about 500° C. during start-up. Thermally induced stresses and strains are high in such a structure and it is desirable to have a strain measurement as a control or warning parameter especially during start-up and stop operations. Long term "creep" effects at full load are also of interest and a gage which has a high degree of stability is also desirable.

SUMMARY OF THE INVENTION

This invention comprises apparatus for measuring strain within a structure by sensing capacitance of the spacing between the internal surface of a cylindrical hole in the structure and the ends of a rod mounted within the hole transverse to the hole axis. The rod is spaced from the cylindrical surface by means which maintain an approximate position of the rod without significantly straining the rod. The ends of the rod and the inner surface of the structure form respective plates of an electrical capacitor. Accordingly, the rod is substantially mechanically isolated from strains in the structure and is a stable sensing element. Since the capacitance of the spacing varies inversely with spacing length a relatively large change of capacitance due to strain may be obtained by assembling the rod with an initial small spacing.

It is therefore a primary object of this invention to provide a strain sensor which is isolated in a substantially strain-free manner from the structure to be measured and which forms an electrical capacitor with the structure having a gap between plates which varies with strain in the structure.

BRIEF DESCRIPTION OF THE DRAWINGS

FIGURE 3 is an elevation view in section of a second embodiment of the strain sensor.

FIGURE 4 is a plan view taken on line 4—4 in FIGURE 3.

DESCRIPTION OF THE PREFERRED EMBODIMENTS

Figure 1:
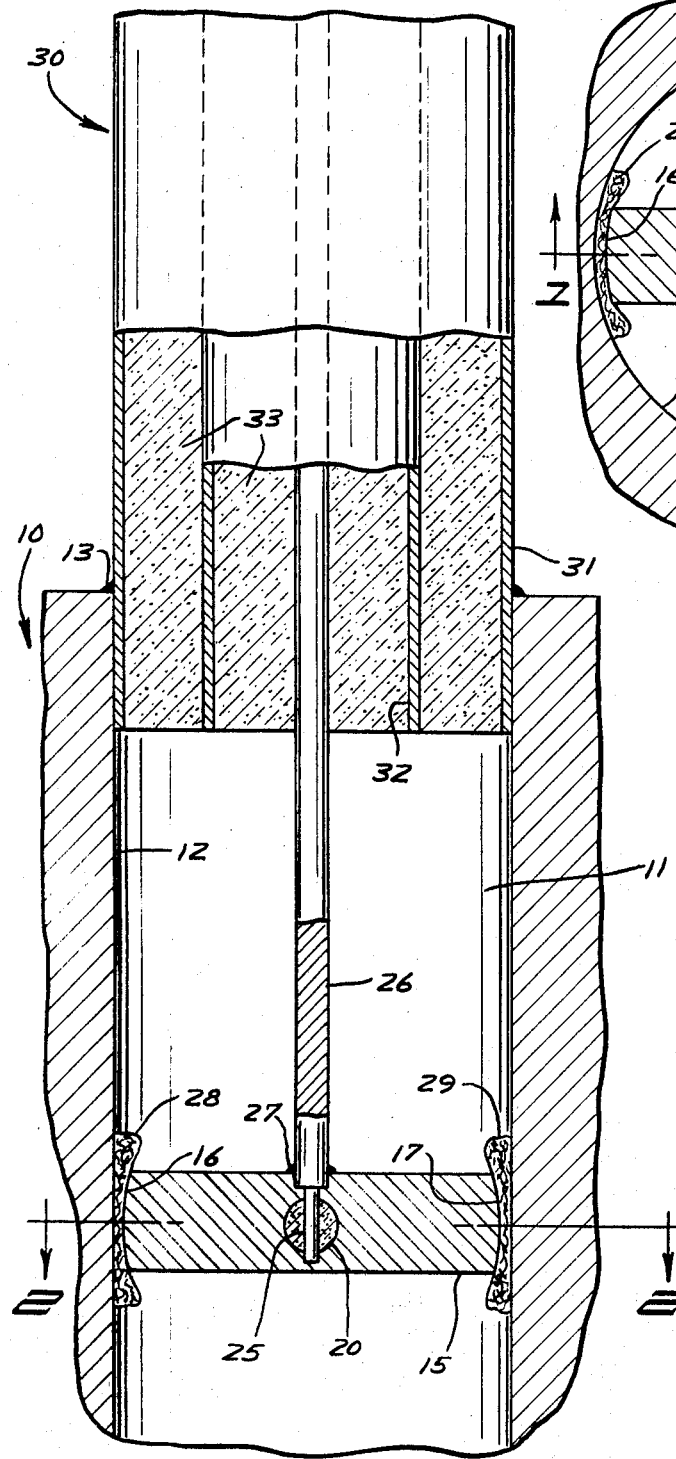
FIGURE 1 is an elevation view in section of a first embodiment of the strain sensor mounted within a hole in a structure.
Figure 2:
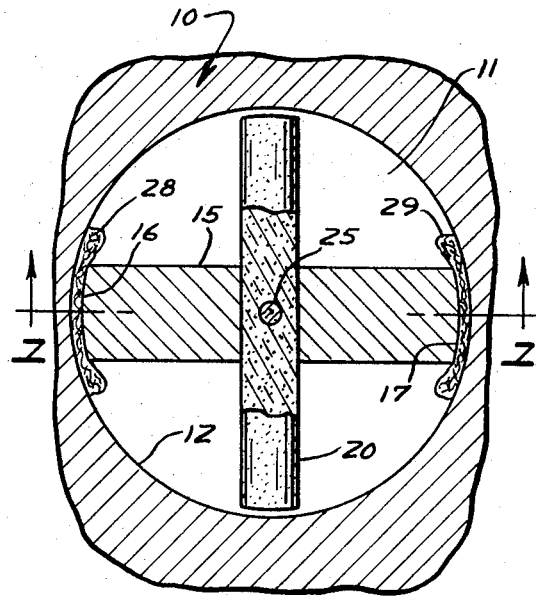
FIGURE 2 is a plan view taken on line 2—2 in FIGURE 1.

Referring to FIGURES 1 and 2 for a description of a first embodiment there is shown a portion of a metal structure 10 having a precise cylindrical hole 11 formed therein. The internal surface 12 bounding the cylindrical hole is carefully prepared by drilling and honing, for example, to give a smooth uniform diameter cavity. A metal rod 15 is positioned within the hole 11 so that its axis is perpendicular to the hole axis. As shown, the rod 15 has a large hole and a small hole which are perpendicular to each other and to the rod axis and are located in the center of the rod. The ends 16, 17 of the rod 15 are hemispherical having a radius equal to or slightly smaller than the radius of the hole 11. An insulator rod 20 having a length slightly smaller than the diameter of the hole 11 is mounted within the large hole in rod 15 and is held in position by projection 25 of conductor 26 which projection extends into the small hole in rod 15 and through a receiving hole in rod 20. Rod 20 also has ends which are hemispherical having a radius equal to or somewhat smaller than radius of hole 11. Projection 25 preferably has a slight taper providing an interference fit with rod 20 and conductor 26 is welded to rod 15 at 27 so that the assembly including rod 15, rod 20, and conductor 26 maintains substantially fixed relative positioning of rods 15 and 20. The clearance between insulator rod 20 and surface 12 is just large enough to accommodate changes in dimensions due to temperature and strain without giving mechanical interference at both ends. For a 3/4" diameter hole 11 this clearance may be about one mil for example. The clearance between the rod ends 16, 17 of rod 15 and surface 12 is larger and may be about five to ten mils and is occupied by insulators 28, 29. Insulators 28 and 29 are shown as pads of material which are compressed between rod ends 16, 17 and surface 12. Insulators 28, 29 preferably have some resiliency and, thus, make constant contact both to surface 12 and the rod ends and tend to center rod 15 within hole 11. The insulators may be conveniently formed from loosely woven glass or quartz fiber for example, or may be pieces of expanded mica. Conductor 26 forms the inner conductor of a double shielded conducting cable 30 which has an outer metallic sheath 31 welded to structure 11 at 13. The inner conducting sheath 32 is situated approximately midway between inner conductor 26 and outer sheath 31 and the space between 26 and 32 and between 32 and 31 is filled with insulation 33 comprising a quartz fabric or ceramic powder. Such cables are commonly known in the art and are often compacted by swaging of the entire cable through a draw die after assembly of conductors and insulation. In some instances, the ends of the cables are further treated by firing of the insulation to form a glaze over the ends thereby preventing loss of material from the ends. Such treatments may give a gas porous or non-porous termination depending upon materials and treatment used.

Structure 10 may be a portion of a steam turbine casing which is subjected to high temperature changes during transient operations. In this case, hole 11 could be a ¾" diameter hole formed at least part way through a portion of a 10" thick cast iron casing. Hole 11 is first drilled and then carefully honed to a smooth uniform bore. Rod 15, together with insulators 28, 29 and rod 20, all mounted on the one end of cable 31, is then pushed into hole 11 with care being taken to align the axis of rod 15 with the desired direction of measurement. After rod 15 has been inserted to a desired depth cable 31 is welded or otherwise fastened to structure 10. Central conductor 26 connects to rod 15 and ends 16, 17 of rod 15 to form one electrode of a capacitor. The other capacitor electrode is hole surface 12 which connects electrically to outer shield 31. Typically, outer shield 31 is electrical ground and inner shield 32 is driven at substantially the same potential as central conductor 26 and rod 15 to minimize stray capacitances. Thus, the three conductors 26, 31, and 32 form a three-terminal network and accurate measurements may be made of the clearance, or gap, between ends 16, 17 and surface 12 through a capacitance measurement. An example of a commercially available bridge instrument for making three-terminal capacitance measurements is the Universal Bridge B221 made by the Wayne Kerr Laboratories, Ltd., Chessington, Surrey, England.

Rod 15 is preferably of the same material as structure 10 so that the gap changes due to a uniform temperature change will be small. If the temperature coefficient of expansion of rod 15 is identical to structure 10, the gap change with temperature would equal this temperature coefficient. If the material of rod 15 has a slightly larger coefficient of expansion than structure 10 the change of capacitance with temperature will be nearly zero however in most cases, a uniformity of materials results in a satisfactory design. Rod 20 which aids centering of rod 15 is preferably a ceramic rod of aluminum oxide or sapphire for long life in a high temperature environment. It is desirable that rod 20 have about the same expansion coefficient as structure 10 and rod 15 but in any event rod 20 must be short enough so that interference between both its ends and surface 12 is prevented at all normal combinations of temperature and strain to be encountered.

As structure 10 is strained, as a result of external forces or thermal gradients for example, hole 11 will undergo diameter changes. These diameter changes will not be mechanically transferred to rod 15 since any such changes could only be transmitted through insulators 28, 29 which have a stiffness which is substantially negligible compared to the stiffness of structure 10 and rod 15. Accordingly, rod 15 is isolated from strains in structure 11 and a change in gap between rod ends 16, 17 and surface 12 as measured by the capacitance between conductors 26 and 31 accurately reflects the strain along one axis or direction in structure 10. If strain measurements are desired in more than one direction additional rods similar to rod 15 may be mounted within holes in structure 10. It may be noted that the actual stress condition existing at surface 12 due to a uniaxial uniform tensile force perpendicular to hole 11 is rather complicated. The uniform tensile force will give a uniform tensile stress at a position remote from hole 11. The stress on surface 12 then varies from a tensile stress having a magnitude three times that of the uniform tensile stress at diametral positions perpendicular to the uniform stress direction to a compressive stress equal in magnitude to the uniform tensile stress at diametral positions parallel to the uniform tensile stress direction. This stress condition is of a highly localized nature however and displacement, or motion, of the hole surface 12 generally follows the displacements that occur throughout the strained structure. More precise relations between hole surface deformation and remote strain or stress conditions may be determined by analytic and/or experimental techniques.

In some applications it is desirable to continually flush hole 11 and the components therein with a dry gas and this may be accomplished by leaving the ends of insulation 33 in porous state and remotely connecting tubular electrode 32 to a gas supply (not shown) and letting the gas enter hole 11 by way of the porous insulation between conductors 26 and 32 and leave by way of the porous insulation between conductors 31 and 32. The cavity between conductors 31 and 32 may be vented at any convenient remote location to exhaust the gas.

A second embodiment is shown in FIGURES 3 and 4 where hole surface 51 of structure 50 corresponds to hole surface 12 in structure 10 of FIGURE 1. The hole 52 is formed generally as described in connection with FIGURE 1 except that a smooth bottom surface, or shoulder, 53 is machined perpendicular to the hole axis. Also one or more holes 55 are drilled as shown to accommodate alignment rods described below and a groove 54 is machined near the top of the hole 51 to receive a retainer ring 56. Hole surface 51 forms one electrode of a capacitor and surfaces 61, 62 of member 60 forms the other electrode. The gap between 61, 62 and surface 51 is prevented from going to zero by means of alignment rings 65 and 66 located at the top and bottom ends respectively of electrode member 60. Rings 65 and 66 are of insulator material, preferably a ceramic, and are made to have an inner diameter which gives substantially an interference fit with mating projecting portions of electrode 60. The outer diameter of rings 65 and 66 is slightly larger than the diameter between electrode surfaces 61, 62 but is just small enough so that the maximum deformations of hole 52 may be tolerated without causing interference between rings 65, 66 and hole surface 51. Thus, rings 65, 66 locate electrode 60 approximately centrally in hole 52 and prevent electrode surfaces 61, 62 from coming into contact with surface 51. Insulator rods 67 are dropped loosely through their receiving holes which pass through ring 65, through electrode 60, through ring 66 and into structure 50 via holes 55. These rods are loose fitting to avoid interference and yet prevent electrode 60 from rotating about the axis of hole 52 by acting as "stops."

An annular spring member 68 abuts against the top side of ring 65 and holds rods 67 within their holes as well as holding the electrode assembly comprising rings 65, 66 and electrode 60 against shoulder 53. Spring 68 preferably is of a stiffness sufficiently low so that electrode 60 is not significantly strained by its holding action and yet is maintained in position. The top side of annular spring 68 is held down by outer conductor sheath 71 of cable 70. Cable 70 is retained in position by means of retainer ring 56. Inner conductor 72 is electrically connected to electrode 60 by means of flexible connection 69 and inner conductor sheath 73 is spaced from conductors 71 and 72 by insulation 74.

The embodiment of FIGURE 3 can be gas flushed in the same manner as described above and since a retainer ring is used to hold the cable 70 to structure 50 the incoming gas may be supplied through one or both of the annular insulation filled passages between condutcors 71, 73, and 72, 73. The gas will then exhaust around retainer ring 56 which does not give a gas-tight seal.

The two embodiments shown herein are similar in that an electrode is provided which is substantially isolated mechanically from the structure undergoing strain, thereby providing a "strain-free" mounting of the electrode. The means of isolation is different for the two embodiments. The first embodiment is especially suited for applications where the hole may be deep and of small diameter while the second embodiment may be more satisfactory where the hole is more shallow and where temperature becomes very high.

In either embodiment the capacitance measured is not strongly dependent upon possible small changes in position of the "isolated" electrode. If the electrode is perfectly centered within a cylindrical hole in the first embodiment a small motion of the electrode in any one of the six degrees of freedom will not significantly change the capacitance being measured. In the second embodiment only motions which are transverse to the hole axis are possible and it is equally true for those two degrees of freedom that small motions about a central position will not change the capacitance. A similar small motion of the hole surface will result in a measurable change in capacitance however. The capacitance change due to strain can be quite large. For example, if the hole diameter is ¾" and the strain is $2 \times 10^{-3}$ the hole diameter will change in the order of one mil. Then if the gap is four mils at zero strain the signal at a strain of $2 \times 10^{-3}$ would correspond to a 12.5% capacitance change. This signal is on the order of ten times that available from a resistance gage and since no bonding agents or critical mechanical connections to the structure are required, the embodiments herein disclosed are capable of providing superior measurements under severe measuring conditions.

I claim:

1. A capacitive strain sensor comprising a structure having a cylindrical hole therein bounded by a metal surface at least a portion of which forms first electrode means, and second electrode means supported in a strain-free manner within the hole in spaced relation to the first electrode means, said second electrode means comprising a metal rod having its axis aligned with a diameter of the hole, said rod having first and second hemispherical ends with radii no greater than the hole radius, and resilient insulation means compressed between the hemispherical ends and the metal surface to space said rod in relation to the first electrode means, and an insulator rod having a length slightly less than the hole diameter but greater than the metal rod length attached to the metal rod so that the center of the insulator rod is substantially coincident with the center of the metal rod and the axis of the insulator rod is perpendicular to the axis of the hole and the axis of the metal rod, whereby the insulator rod restricts motion of the metal rod from a central position within the hole.

2. The sensor of claim 1 wherein the metal rod is comprised of material having a thermal coefficient of expansion substantially equal to that of the test structure.

3. A capacitive strain sensor comprising a structure having a cylindrical hole therein bounded by a metal surface at least a portion of which forms a first electrode means and bounded at one end by a perpendicular shoulder, and second metal electrode means supported in a strain-free manner within the hole in spaced relation to the first electrode means, said second electrode means having first and second cylindrical ends spaced along a diameter of the hole and closely spaced from the metal surface, and further comprising first and second ring insulators each having an outer diameter longer than the length of the first and second cylindrical ends and smaller than the hole diameter, means to mechanically engage the metal electrode on a first side with the first ring and a second side with the second ring to position the metal electrode centrally with respect to the first and second rings, and spring means urging the first and second rings and metal electrodes toward the perpendicular shoulder.

4. The sensor of claim 3 wherein a retainer means is provided to prevent the metal electrode from rotating about the axis of the hole.

5. A capacitive strain sensor comprising a structure having a hole therein bounded by a metal surface at least a portion of which forms a first electrode means, and second electrode means supported in a strain-free manner within the hole in spaced relation to the first electrode means, a first end of said hole being substantially closed by a metal sheathed, insulated conductor cable having an insulation porous to gas so that the cable may be used as a gas pipe to transfer a purge gas from a high pressure source to the hole.

6. A capacitive strain sensor comprising a structure having a substantially cylindrical hole therein bounded by a metal surface at least a portion of which forms a first electrode means, and second electrode means supported in a strain-free manner within the hole in spaced relation to the first electrode means, said second electrode means comprising a conductive member centered in said hole and having a pair of opposed end surfaces positioned closely adjacent the hole surface, a bisector of said end surfaces lying on a diametral line of said hole, said member being substantially thinner than the diameter of said hole in direction at right angles to said diametral line and to the axis of said hole.

7. The sensor of claim 6 wherein the member is a rod elongated in direction along said diametral line.

8. The sensor of claim 6 wherein said member comprises a plate like member having a bisecting plane defined by the diametral line and the axis of said hole.

References Cited

UNITED STATES PATENTS

| | | | |
|---|---|---|---|
| 2,571,507 | 10/1951 | Welch | 317—246 X |
| 3,206,970 | 9/1965 | Dally | 317—246 X |
| 3,260,903 | 7/1966 | Kumano | 317—246 |
| 3,381,190 | 5/1968 | Hoogenboom | 317—246 |

E. A. GOLDBERG, Primary Examiner

U.S. Cl. X.R.

73—398; 317—256